United States Patent [19]

Mikalonis

[11] Patent Number: 4,574,336

[45] Date of Patent: Mar. 4, 1986

[54] CORNICE LIGHTING FIXTURE FOR MASS TRANSIT VEHICLES

[75] Inventor: Liudas K. Mikalonis, Northville, Mich.

[73] Assignee: Transmatic, Inc., Waterford, Mich.

[21] Appl. No.: 594,020

[22] Filed: Mar. 27, 1984

[51] Int. Cl.[4] .............................................. B60Q 1/00
[52] U.S. Cl. ...................................... 362/260; 362/74; 362/151; 362/223
[58] Field of Search ................. 362/74, 147, 151, 260, 362/223, 217; 427/389.8, 407.3; 428/268

[56] References Cited

U.S. PATENT DOCUMENTS 4,387,415 6/1983 Domas .................................... 362/74

Primary Examiner—Donald P. Walsh
Attorney, Agent, or Firm—Reising, Ethington, Barnard, Perry & Milton

[57] ABSTRACT

A cornice lighting fixture 10 is disclosed for use on a mass transit vehicle 12 and comprises a unitary molded body 22 including a trim panel 26 and a lamp panel 24. The trim panel includes a mounting flange 62 along the outer edge and the lamp panel is provided with a connector 72 for mounting the fixture to the vehicle roof 14. A lens 34 is hingedly mounted by the connector 72 and secured to the trim panel 22 by a closure flange 96. A fluorescent tube 32 is disposed within a lamp housing which is comprised of the lamp panel 24 and the lens 34. The connector 72 is a separate extruded strip secured to the lamp panel and provides a double-wall for mounting to the vehicle. A pair of retainer strips 122, 124 are extruded sections secured to the surface of a panel section 56 for retaining an advertising card 44.

4 Claims, 6 Drawing Figures

CORNICE LIGHTING FIXTURE FOR MASS TRANSIT VEHICLES

FIELD OF THE INVENTION

This invention relates to lighting fixtures; more particularly, it relates to cornice lighting fixtures for mass transit vehicles such as buses and trains.

BACKGROUND OF THE INVENTION

Cornice lighting fixtures for mass transit vehicles have reached a high degree of development for the attainment of optimum light distribution, energy efficiency, small weight and space requirements, durability, and low cost. There remains a need for improvement in cost reduction without sacrifice of the other attributes of the state of the art cornice lighting fixtures.

U.S. Pat. No. 4,387,415 discloses a cornice lighting fixture for mass transit vehicles which includes a unitary member defining a light housing and a trim panel. A light cover encloses a fluorescent tube mounted within the light housing. The light housing and trim panel are provided with an elongated shape of uniform cross-section of fiberglass reinforced plastic made by a pultrusion process. The light housing defines the inward longitudinal margin of the fixture and an outer mounting flange of the trim panel defines the lower and outward longitudinal margin of the fixture. The housing and trim panel cooperate to partially define an air duct for use in the heating and cooling system of the vehicle. A horizontal wall of the light housing has an inward securement formation that receives an upper edge of the light cover while the vertical wall of the light housing extends downwardly from the horizontal wall thereof for connection to the trim panel. The lower edge of the light cover is secured adjacent the connection between the trim panel and the light housing. The trim panel is concave and has upper and lower tabs for mounting an advertising sign. The tabs and the aforementioned securement formation for receiving the edge of the light cover are unitary with the trim panel and the light housing, respectively, and hence the pultrusion process is the only practical manufacturing technique.

Other prior art cornice lighting fixtures for mass transit vehicles are disclosed in the following U.S. Pat. Nos.: Schwenkler 3,210,875; Schwenkler 3,211,904; and Bhatt 4,157,584.

A general object of this invention is to provide an improved cornice lighting fixture for mass transit vehicles which affords economy of manufacture and versatility of design not afforded by the prior art.

SUMMARY OF THE INVENTION

In accordance with this invention, an improved cornice lighting fixture is provided for mass transit vehicles; the improved fixture is of such design so as to be economical to manufacture and install as well as effective in use.

In accordance with this invention, a lighting fixture comprises a sheet like unitary molded body including a lamp housing on one longitudinal margin and a trim panel on the other margin of the fixture. The trim panel extends obliquely in a downward and outward direction from a corner-like juncture of one edge thereof with one edge of the lamp housing. A mounting flange of the trim panel extends along the other edge with an oblique portion extending outwardly and upwardly and terminating in a horizontal portion. The lamp housing includes a vertical portion extending upwardly from said one edge thereof and includes a horizontal portion extending inwardly and terminating in a free edge such that the lamp housing opens inwardly and downwardly and is adapted to receive a fluorescent tube. An extruded connector extends along the free edge and overlaps the horizontal portion to provide a double-wall strip for mounting the fixture to the vehicle. The connector has a groove extending along the free edge and opening downwardly. An elongated lens cooperates with said housing to enclose the fluorescent tube and has an upper edge interlocked in said groove. The lower edge of the lens terminates adjacent the corner-like juncture and is secured to the body by a removable fastener. First and second extruded retainer strips are secured to the trim panel and extend longitudinal thereof; the retainer strips have an overhanging lip to define retaining grooves opening toward each other and adapted to receive the edges of an advertising card to retain it on the trim panel.

Further, in accordance with this invention, the retainer strip adjacent the corner-like juncture has a flat portion disposed between the lower edge of the lens and the trim panel to provide a double-wall for engagement by the removable fastener. Further, the retainer strip may be in wraparound conformity with the corner-like juncture. The lower edge of the lens is seated against a portion of the retainer strip which is in face-to-face engagement with the trim panel to provide a double-wall for engagement by the removable fastener. Alternatively, the retainer strip may have a seating portion extending inwardly of the corner-like juncture and the lower edge of the lens may be secured thereto by the removable fastener.

A more complete understanding of this invention may be obtained from the detailed description that follows taken with the accompanying drawings.

BEST MODE FOR CARRYING OUT THE INVENTION

Figure 1:
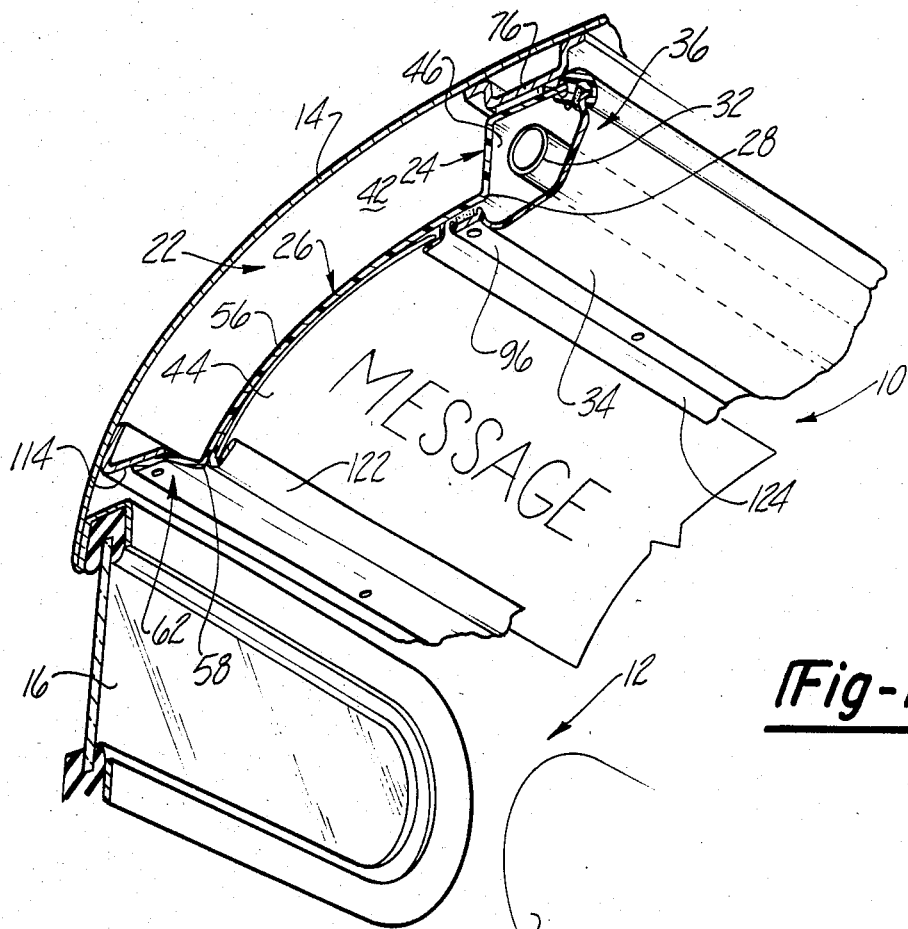
FIG. 1 is a pictorial view of the interior of a mass transit vehicle with a cornice lighting fixture constructed in accordance with this invention.

Referring now to the drawings, there is shown an illustrative embodiment of the invention in a cornice lighting fixture for a bus. It will be appreciated, as the description proceeds, that the invention may be utilized in other embodiments.

FIG. 1 shows cornice lighting fixture 10 of this invention installed in a bus 12. The lighting fixture is mounted to the roof 14 above the side window 16 and over the passenger seating. Several such lighting fixtures are placed in end-to-end relationship so as to provide a continuous cornice structure along the length of the bus.

Figure 2:
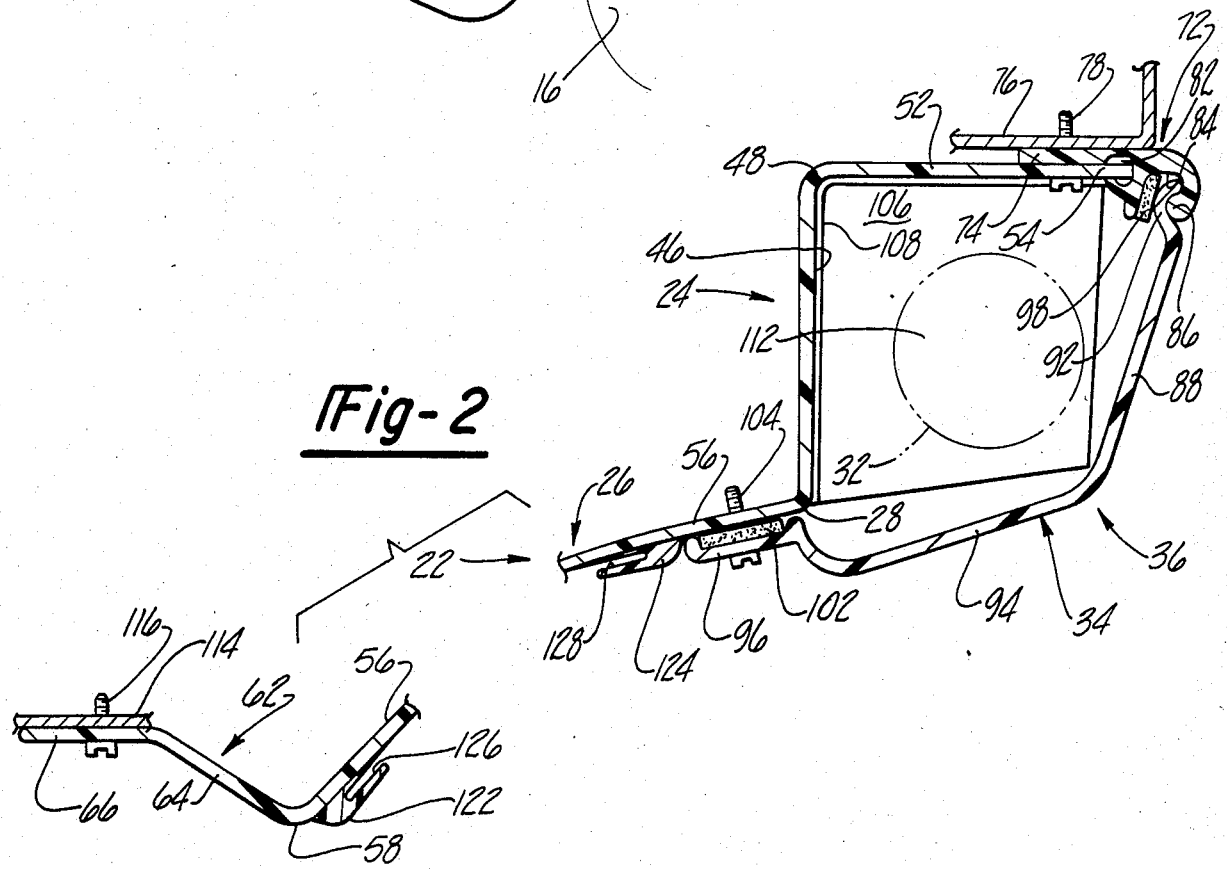
FIG. 2 is a cross-sectional view through the cornice lighting fixture.

As shown in FIGS. 1 and 2, each lighting fixture 10 comprises an elongated unitary body 22 including a lamp panel 24 and a trim panel 26. The lamp panel 24 defines an upper and inward longitudinal margin of the lighting fixture whereas the trim panel 26 extends obliquely in a downward and outward direction from the lamp housing and defines the other longitudinal margin of the fixture. The inner edge of the trim panel 26 is joined with the outer edge of the lamp panel 24 at a corner-like juncture 28. The lamp panel 24 opens inwardly and a fluorescent tube 32 is enclosed therein by a lens 34. The lens 34 is extruded plastic, suitably a polycarbonate plastic of translucent composition, e.g. of wite color, so as to diffuse the light from the fluorescent tube and illuminate the interior of the bus.

The lamp panel 24 and the trim panel 26 of the unitary body 22 coact with the bus roof 14 to provide an air duct 42. The air duct is a part of the heating and cooling system of the bus and carries forced air to suitable registers, not shown. The unitary body 22 serves as an uninterrupted wall of the duct 42 and forms a closed joint with the bus roof at the mounting points which will be described subsequently. Also, the lamp panel 24 and the lens 34 form a sealed lamp housing 36 to prevent entrance of dirt particles which would impair the effectiveness of the lens. The trim panel 26 is concave in cross-section extending obliquely from the lamp housing 36 in a downward and outward direction. This configuration increases the available head room below the light fixture. It also is especially adapted to receive an advertising card 44, or a set of such cards side-by-side in a manner which will be described subsequently. Light from the lamp housing 36 shines through the lens 34 to provide general illumination for the bus and also to illuminate the front face of the advertising card 44.

The structure of the trim panel 26 and the lamp panel 24 will now be described in detail. The lamp panel 24 comprises a vertical portion 46 which extends upwardly from the corner-like juncture 28 between the lamp panel 24 and the trim panel 26. The vertical portion 46 terminates in an arcuate corner 48 and a horizontal portion 52 extends therefrom in an inward direction and terminates in a free edge 54. The trim panel 26 comprises a panel section 56 which extends from the corner-like juncture 28 in an outwardly and downwardly direction and terminates in an arcuate corner 58 of approximately 90 degrees at a juncture with a mounting flange 62. The mounting flange 62 extends along the outer edge of the panel section 56. It includes an oblique portion 64 extending outwardly and upwardly and terminating in a horizontal mounting strip 66 for attachment to the vehicle. The unitary body 22 just described, is of such cross-sectional configuration that it is adapted to be formed by molding, i.e. by male and female mold or die members in mating relationship. Preferably, the unitary body 22 is made of a plastic material. A preferred plastic is fiberglass reinforced polyester resin. The molded fiberglass reinforced polyester comprises spaced layers of fiberglass cloth embedded within a cured layer of polyester resin. Suitably, the cured polyester resin is opaque and has an off white color. It will now be appreciated that a broad range of plastic materials are available with requisite properties for the molded unitary body 22. In addition to fiberglass reinforced plastic such as polyester resin, plastic surface laminates may be selected. Additionally, it is noted that the unitary body 22 may be formed of sheet metal by a conventional die members in a mutual press. Since the configuration of the unitary body 22 lends itself to molding or die pressing, a wider range of materials is available to afford the characteristics desired such as thermal insulation, durability, light weight and so-called anti-graffiti surfaces.

The lamp housing 36 comprising the lamp panel 24 and the lens 34 will now be described in detail. For purposes of mounting the light fixture 10 and supporting the lens 34, a bracket or connector 72 is provided. The connector 72 extends along the free edge 54 of the horizontal portion 52 and is attached thereto. The connector 72 has a horizontal portion 74 which overlaps the horizontal portion 52 of the lamp panel and provides a double-wall mounting strip for connecting the fixture to the vehicle. The horizontal portion 74 is seated against a mounting bracket 76 welded to the roof 14 of the vehicle and is attached thereto by screws 78 (only one shown). The connector 72 is preferably extruded plastic or aluminum. It is formed with a channel 82 adapted to receive the free edge 54 of the lamp panel. The horizontal portion 74 of the connector is attached with a suitable adhesive to the horizontal portion 52 of the lamp panel. The connector 72 is also formed with a longitudinal groove 84 with a re-curved bead 86 along the edge of the groove which narrows the opening of the groove. The groove 84 is adapted to receive the upper edge of the lens 34 in an interlocking arrangement, as will be described presently.

The lens 34 is an elongated member of extruded plastic of a translucent composition having a white color so as to diffuse the light which shines therethrough. Preferably, the lens 34 is extruded from polycarbonate plastic. It will be appreciated that the lens 34 may be formed of a translucent material with planar surfaces to provide light diffusion or, alternatively, it may be formed of a transparent material with flutes or prisms on the surfaces for controlling the direction of light transmitted therethrough. The lens 34 comprises an upper lens panel 88 which is provided with an upper edge 92 of S-shape in cross-section. The lens 34 also includes a lower lens panel 94 joined at an obtuse angle with the lens panel 88. The lower lens panel 94 is disposed at a lower level than the corner-like juncture 28 and is curved upwardly at its inner edge and terminates in the closure flange 96. The closure flange 96 has a channel-shaped upper section and is adapted to seat against the lower surface of the panel section 56 of the trim panel 26. The lens 34 is installed in the fixture by insertion of the S-shaped upper edge 92 into the groove 84 of the connector 72. A sealing strip 98 is secured by an adhesive to the inner side of the groove 84. With the edge 92 of the lens 34 inserted in the groove 84 it is hingedly connected and interlocked with the connector 72 in engagement with the sealing strip 98. The closure flange 96 carries a sealing strip 102 in its channel section and the strip 102 engages the surface of the panel section 56 when the closure flange 96 is seated thereagainst. The closure flange 96 is secured to the panel section 56 by screws 104 (only one of which is shown). The lamp panel 24 is provided with an end cap 106 at each end to close the ends of the housing. Each end cap 106 is provided with a peripheral flange 108 secured to the vertical wall 46 and horizontal wall 52, as by an adhesive material. Additionally, the end cap 106 carries an electrical socket 112 which receives the end of the fluorescent tube 32. When each end of the lamp panel 24 is provided with an end cap 106, the fluorescent tube is supported therebetween; in some installations, it is desirable to use fluorescent tubes of a length that corresponds to two or more fixtures and in such cases the end caps will be omitted at the adjoining ends of the fixtures.

The fixture 10 is also secured to the vehicle body at the outer margin of the trim panel 22 by the mounting strip 66. For this purpose, the mounting strip 66 is seated against a mounting bracket 114 and secured thereto by screws 116, only one of which is shown. The mounting bracket 114 is suitably welded to the groove 14 of the vehicle.

In order to removably mount the advertising card 44 on the panel section 56, the trim panel is provided with a lower retainer strip 122 extending longitudinally thereof and an upper retainer strip 124 extending parallel to strip 122. The strips 122 and 124 are provided with lateral grooves 126 and 128, respectively, which are disposed in facing relation and adapted to receive the upper and lower edges of the advertising card 44. The retainer strips 122 and 124 are formed of extruded plastic and are secured to the surface of the panel section 56 by adhesive. The strips 122 and 124 are spaced apart a distance corresponding to the height of the advertising card 44 to be used therewith.

Figure 6:
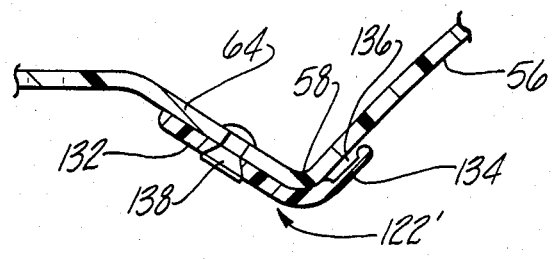
FIG. 6 shows a modification of the lower retainer strip.

A modified lower retainer strip 122' is shown in FIG. 6. In this construction, the retainer strip 122' is formed as an extrusion of plastic material with a base portion 132 and a unitary flange 134. The base portion 132 is of such configuration as to conform to the surface of the oblique portion 64 and the arcuate corner 58 in a wraparound fashion. The flange 134 is a thinner section than the base portion 132 and thus forms a slot 136 with the panel section 56 to receive the lower edge of the advertising card 44. The base portion 132 is secured to the oblique portion 64 of the mounting flange 62 by adhesive and also by a squeeze rivets 138, only one of which is shown.

Figure 3:
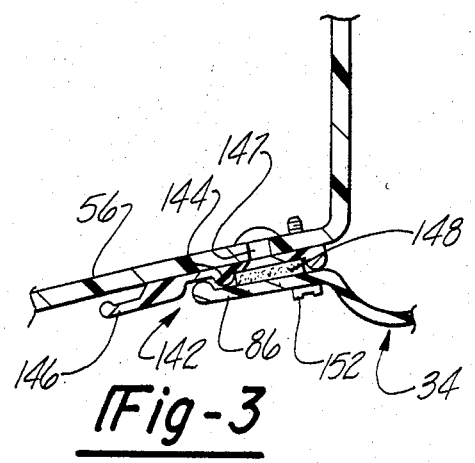
FIGS. 3, 4 and 5 show modifications of upper retainer strips.
Figure 4:
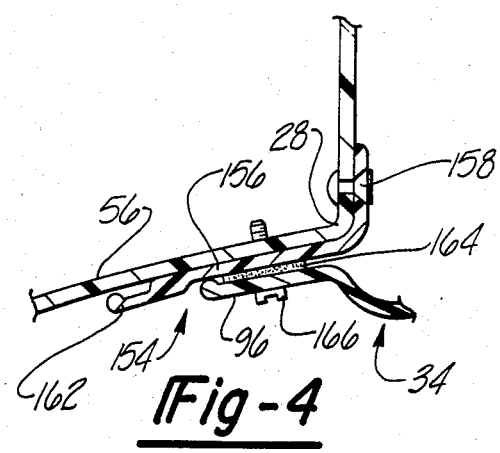
Figure 5:
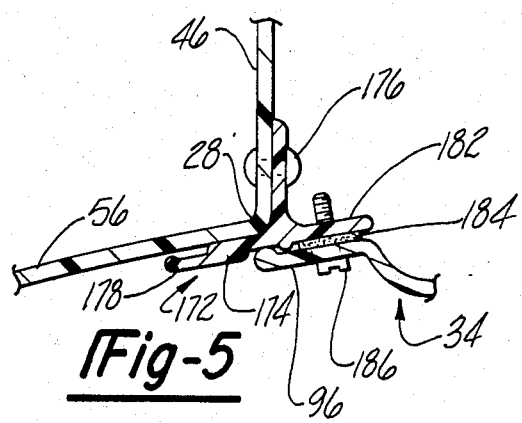

FIGS. 4, 5 and 6 show modified upper retainer strips. In FIG. 3, the upper retainer strip 142 comprises a base portion 144 and a flange 146. The base portion 144 is secured to the lower surface of the panel section 56 by an adhesive and, if desired, by squeeze rivets 147. The flange 146 and the base panel 56 form a slot which is adapted to receive the upper edge of the advertising card 44. The lower surface of the base portion 144 is formed with a channel which receives a sealing strip 148. The closure flange 86 of the lens 34 is seated against the base portion 144 of the retainer strip and is secured by screws 152 which extend into the double-wall thickness of the base portion 144 and the panel section 56.

FIG. 4 shows a modification in which the upper retainer strip 154 has a base portion 156 which is seated against the panel section 56 and wraps around the corner-like juncture 28. The base portion 156 is secured by adhesive and by rivets 158. The retainer strip 154 is provided with a flange 162 which cooperates with the panel section 56 to form a slot to receive the upper edge of the advertising card 44. The closure flange 96 of the lens 34 is seated against the base portion 156 with a sealing strip 164 therebetween. The flange 96 is secured by screws 166 to the double layer arrangement of the base portion 156 and the panel section 56.

FIG. 5 shows a modified upper retainer strip 172 having a base portion 174 which has a configuration conforming to the corner-like juncture 28 between the panel section 56 and the vertical portion 46 of the lens panel. The base portion 174 is secured to the vertical portion 46 by rivets 176 and, if desired, it may be further secured by an adhesive to the vertical portion 46 and the panel section 56. The retainer strip 172 is provided with a flange 178, which in cooperation with the panel section 56, forms a slot adapted to receive the upper edge of the advertising card 44. Additionally, the retainer strip 172 is provided with a seating portion 182 which extends laterally of said base portion 174 and in an inwardly direction from the corner-like juncture 28. The closure flange 96 of the lens 34 is seated against the seating portion 182 with a sealing strip 184 therebetween. The closure flange 96 is secured to the seating strip 182 by screws 186.

Although the description of this invention has been given with reference to a particular embodiment, it is not to be construed in a limiting sense. Different modifications and variations will now occur to those skilled in the art. For a definition of the invention reference is made to the appended claims.

I claim:

1. A cornice lighting fixture for mass transit vehicles, said fixture comprising:

an elongated sheet-like unitary molded body including a lamp panel defining one longitudinal margin of the fixture and a trim panel extending obliquely in a downward and outward direction from a corner-like juncture of one edge thereof with one edge of the lamp panel and defining the other longitudinal margin of the fixture, said trim panel including a mounting flange extending along the other edge thereof, said lamp panel including a vertical portion extending upwardly from said one edge thereof and including a horizontal portion extending inwardly from the vertical portion and terminating in a free edge, said lamp panel opening inwardly and downwardly and adapted to receive a fluorescent tube, an extruded connector extending along said free edge and attached thereto, said connector having a horizontal portion overlapping said horizontal portion of the lamp panel to provide a double-wall mounting strip for connecting the fixture to the vehicle, said connector having a groove therein extending along said free edge and opening downwardly, an elongated lens cooperating with said lamp panel to enclose said fluorescent tube and having an upper edge interlocked in said groove and having a lower edge terminating adjacent said corner-like juncture and secured to said one edge of said trim panel outwardly of said corner-like juncture by a removable fastener, first and second extruded retainer strips secured to said trim panels and extending longitudinally thereof in parallel spaced relation, each of said retainer strips having an overhanging lip extended along one edge thereof and spaced from the surface of said trim panel to define a retaining groove which opens toward the other retainer strip, said retaining grooves being adapted to receive the edges of an advertising card to retain it on said trim panel adjacent said lamp housing, said first retainer strip being disposed outwardly of said lower edge of said lens.

2. The invention as defined in claim 1 wherein said first retainer strip has a flat portion disposed between said lower edge of said lens and said trim panel to provide a double-wall for engagement by said removable fastener.

3. The invention as defined in claim 1 wherein said first retainer strip has a flange thereon, said first retainer strip being in wraparound conformation with said corner-like juncture, said lower edge of said lens being seated against a seating portion of said first retainer strip which is in face-to-face engagement with said trim panel to provide a double-wall for engagement by said removable fastener.

4. The invention as defined in claim 1 wherein said first retainer strip has a flange thereon, said first retainer strip being in wraparound conformation with said corner-like juncture, and having a seating portion extending inwardly of said corner-like juncture, said lower edge of said lens being seated against said seating portion and secured thereto by said removable fastener.

* * * * *